May 27, 1958 — I. G. CRUCKSHANK — 2,836,230
EMERGENCY FUEL PUMPING SYSTEM
Filed Jan. 7, 1953
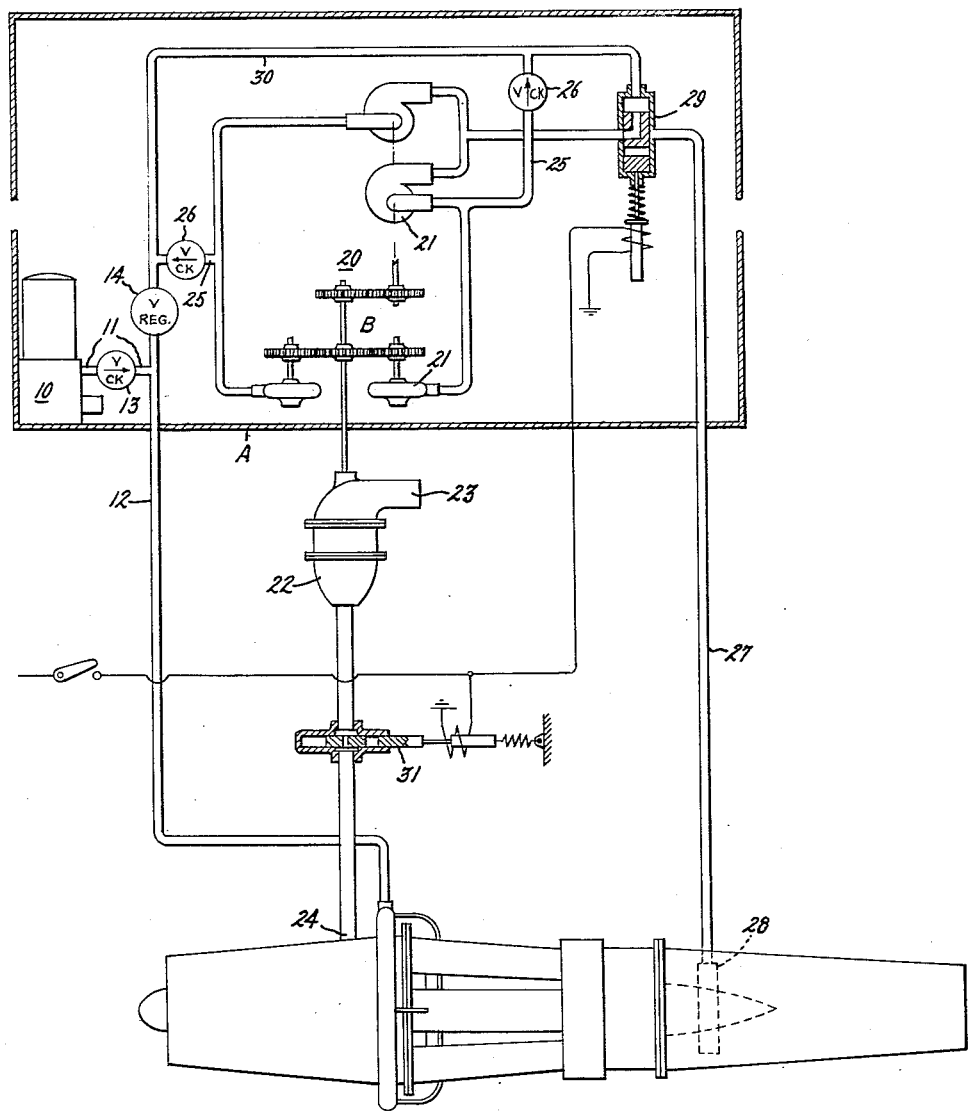
Inventor:
Ira G. Cruckshank,
by Richard E. Hosley
His Attorney.

United States Patent Office 2,836,230
Patented May 27, 1958

2,836,230

EMERGENCY FUEL PUMPING SYSTEM

Ira G. Cruckshank, Malden, Mass., assignor to General Electric Company, a corporation of New York Application January 7, 1953, Serial No. 330,037

7 Claims. (Cl. 158—36.4)

The present invention relates generally to aircraft fuel systems and in particular to an emergency fuel boost pumping system.

It is an object of invention to provide a simplified emergency fuel boost pumping system in which the total weight of components involved is reduced by utilizing certain fuel pumping units in a dual capacity.

It is another object of invention to provide an emergency fuel boost pumping system by employing elements of a reheat or afterburner fuel pump system.

A still further object of invention is to provide for regulation of main fuel system boost pressure by operation of a reheat fuel pump.

These and other objects and advantages of invention will become apparent from the following description read in conjunction with the accompanying drawing, in which the figure discloses a schematic showing of an improved emergency fuel boost pumping system, the showing of stop cock, flow divider and similar fuel control structures being omitted for the purposes of this disclosure.

The objects of my invention may be accomplished by interconnecting the discharges of the main and reheat fuel boost pumps with a pressure responsive valve means, for selectively controlling the discharge from the reheat fuel boost pump.

In the drawing, the bottom of a fuel tank is disclosed generally at A, with a main fuel boost pump at 10 and a reheat fuel and/or fuel boost, two-stage centrifugal pump at 20: the main fuel boost pump 10 has a discharge conduit 11 leading to the main fuel system inlet conduit shown at 12, with a check valve located at 13, to prevent back flow into the pump, and a pressure regulating valve at 14.

The reheat fuel or fuel boost pump 20 is comprised of a pair of two-stage centrifugal pump units. The stages shown are split in halves, but this feature is not necessary to the operation of the system and is only one of the many ways of combining the driving and pumping units. One of the pairs is indicated at 21—21, driven by an air turbine 22 which discharges to the atmosphere at 23, through appropriate gearing and shafting at B, with the operational fluid for the turbine stage tapped from the compressor discharge at 24. The two centrifugal stages are required in order to obtain satisfactory pumping performances with highly volatile fuels. The disclosed method of driving the centrifugal pump elements is incidental and is one of many.

The interstage of both of the pump units 21—21 has a discharge conduit 25, leading to the main fuel system inlet conduit 12, to which it is joined through the pressure regulating valve 14, with check valves 26 between, to prevent recirculatory flow. The second stage of the reheat pump units is discharged through the conduit 27 to the reheat fuel system manifold at 28, passing through reheat fuel control valve 29, which may be set to open directly to the reheat fuel system, in its upper position or opposite that indicated in the schematic showing, or it may be set in its lower position as disclosed herein, to circuit the second or high pressure stage flow into main fuel system inlet conduit 12, by way of conduit 30 and through the pressure regulating valve 14, which is set for a certain minimum value, so that when the main fuel discharge pressure falls below this minimum value, the pressure regulating valve opens to permit the reheat fuel boost pump to make up the difference in flow.

The operation of the air turbine is governed by the air control valve 31, which is shown in the "closed," i. e., partially open positon of an "on-partly on" valve.

The system works as follows:

With the main fuel system in operation only, simultaneously the air control valve 31 is placed in the partly-on position and a control valve 29 in its lower or bypass position so that the reheat fuel pump is operating only to maintain constant main fuel boost pressure, i. e., fuel flows from the interstage and discharge of the reheat fuel pumps through conduits 25 and 30 to make up any deficiency in pressure in the main fuel discharge conduit 11 leading to the main fuel system inlet conduit 12. If the main fuel boost pump fails, then the reheat fuel pumping system will carry the full load as an emergency fuel boost pump. Depending on the position of the openings of the air control valve 31, the operation of the reheat fuel boost pump may be restricted somewhat, but because of pump characteristics, this restriction of operation is negligible.

When the main and reheat fuel systems are both in operation, with the position of valves 29 and 31 opposite that shown in the figure, in the event of main fuel boost pump failure, the reheat pump takes over to supply full fuel boost pressure to the main fuel boost system from the interstage, and reheat fuel is supplied from the high pressure stage of the centrifugal pumps.

The operation of the system could be reversed, i. e., the reheat fuel of fuel boost pump could serve to provide fuel to the main and reheat fuel systems as in the present set-up when failure of the main fuel boost pump occurs.

It will be evident to those skilled in the art that the objects of invention are accomplished with a minimum number of added elements and without the use of a separate emergency fuel boost pump and its associated parts; that an electrical interconnection among the pressure regulating, reheat fuel control and air control valves for automatic operation of an emergency fuel boost pumping system is possible.

Although many changes can be made in the disclosed apparatus without departing from the scope of the claims, it is intended that all matter contained in the preceding descripton and shown in the accompanying drawing shall be interpreted as illustrative and not limitative.

What I claim as new and desire to secure by Letters Patent of the United States is:

1. In a combination adapted to supply fuel under pressure, a main booster pump having a check-valved discharge conduit, a staged reheat fuel pump having a check-valved discharge conduit at an interstage connection with said discharge conduit from said main booster pump and a discharge conduit from a higher stage of said reheat fuel pump also connected to said main booster pump conduit, said check-valved discharge conduits being interconnected by a pressure sensing control valve regulated by the flow in said discharge conduit of said main booster pump, said control valve varying the discharge to the reheat and main fuel systems.

2. In an emergency fuel pumping system for use in an aircraft, a pair of pumping means comprising a main fuel boost pumping means having a discharge conduit and a reheat fuel boost pumping means, said latter means comprising a multi-stage pump having discharge conduits from an interstage and final stage interconnected to said main fuel discharge conduit, means responsive to the discharge pressure of said main fuel boost pumping means at the interconnection of said conduits, said last-mentioned means being adapted to regulate the flow from the conduits of said multi-stage pump.

3. An emergency fuel boost pump system comprising a main boost pump having a discharge conduit leading therefrom, a two-stage reheat fuel boost pump operating independently of said main boost pump and having interstage and final stage discharge conduits joined to said discharge conduit from said main booster pump through a pressure responsive valve, said valve being adapted to regulate the direction of flow from said discharge conduits of said two-stage fuel boost pump in response to the variations in pressure in said discharge conduit from said main boost pump.

4. In a fuel system for an aircraft comprising a main circuit and a reheat circuit, the combination of a main fuel boost pumping means having a discharge conduit connected to said main circuit, said discharge conduit including pressure responsive means, and a reheat fuel boost pumping means having at least two pumping elements in series, discharge conduits leading from an interstage and final stage of said reheat fuel boost pumping means connected to the main fuel boost discharge conduit through said pressure responsive means, said pressure responsive means regulating the fluid flow from said reheat fuel boost pumping means.

5. In an emergency fuel boost pump combination for a main fuel system, a reheat fuel system connected thereto through pressure regulating means and comprising multi-stage pumping elements in series for providing discharge fluid to said main and reheat fuel systems, said pressure regulating means being responsive to interstage pressure, and valve means establishing communication between said reheat fuel system and the final stage of said multi-stage pumping elements and comprising means for interrupting said communication and establishing connection between said final stage and said pressure regulating means.

6. In a fuel boost pump assembly as set forth in claim 5, said multi-stage pumping elements having a turbine drive and including means for simultaneously controlling said valve means and regulating the supply of motive fluid for operating said pumping elements.

7. In an emergency fuel boost pumping system, a pair of independently operative pumps for providing fuel to a main fuel system and a reheat fuel system, one of said pumps having communication with the inlet conduit of said main fuel system having pressure responsive means therein, the other of said pumps having at least a pair of pumping elements in series and communicating at the final stage with said reheat fuel system through a control valve, said pumping elements having a turbine drive, said pair of pumps being in communication with each other through said pressure responsive means at all stages of said reheat pump, and interconnecting means for regulating the flow of operative fluid for said turbine drive and for directing the fuel flow through said control valve simultaneously.

References Cited in the file of this patent

UNITED STATES PATENTS

| | | |
|---|---|---|
| 1,970,380 | Hosel | Aug. 14, 1934 |
| 2,218,565 | Vickers | Oct. 22, 1940 |
| 2,366,388 | Crosby | Jan. 2, 1945 |
| 2,506,611 | Neal et al. | May 9, 1950 |
| 2,532,856 | Ray | Dec. 5, 1950 |
| 2,595,618 | Vogt et al. | May 6, 1952 |
| 2,607,297 | Walker et al. | Aug. 19, 1952 |
| 2,617,361 | Neal | Nov. 11, 1952 |
| 2,640,316 | Neal | June 2, 1953 |